UNITED STATES PATENT OFFICE.

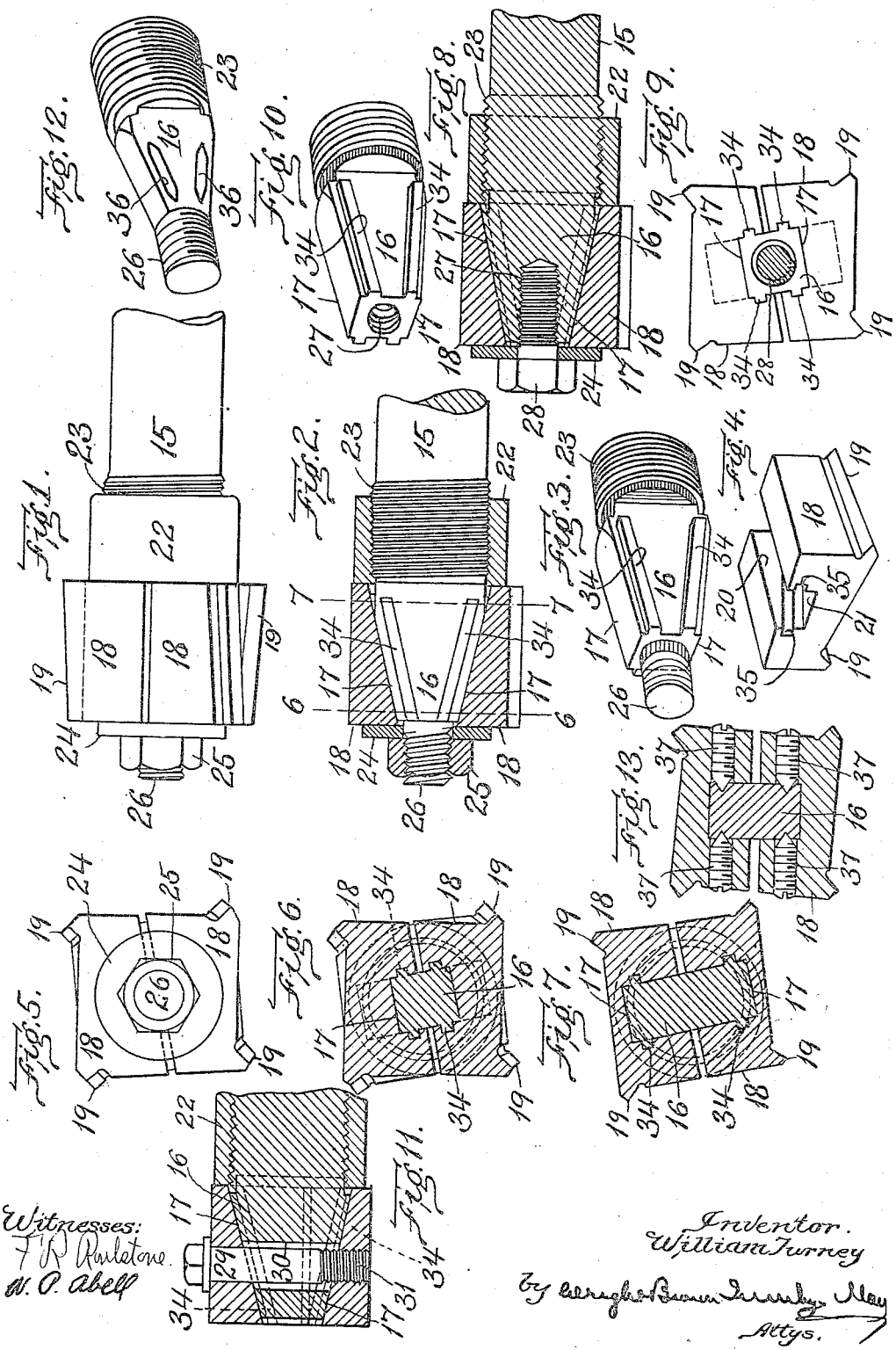

WILLIAM TURNEY, OF HYDE PARK, MASSACHUSETTS.

ADJUSTABLE REAMER.

959,273.   Specification of Letters Patent.   Patented May 24, 1910.

Application filed January 22, 1909. Serial No. 473,764.

*To all whom it may concern:*

Be it known that I, WILLIAM TURNEY, of Hyde Park, in the county of Norfolk and State of Massachusetts, have invented certain new and useful Improvements in Adjustable Reamers, of which the following is a specification.

This invention relates to adjustable reamers and has for its object to provide a reamer comprising a shank and a plurality of cutting members which are adapted to be moved toward or from the axis of the shank and clamped thereon by means longitudinally movable on the shank. This may be accomplished in a variety of ways, of which several are illustrated upon the accompanying drawings and described in the following specification.

On the drawings, Figure 1 represents a side elevation of the cutting end of a shank provided with one form of cutting members and appropriate clamps therefor. Fig. 2 is a longitudinal section of the form shown by Fig. 1. Fig. 3 is a perspective view of the end of the shank. Fig. 4 is a perspective view of one of the cutting members. Fig 5 is an end elevation of the cutting end of the reamer. Fig. 6 is a cross section on line 6—6 of Fig. 2. Fig. 7 is a cross section on line 7—7 of Fig. 2. Fig. 8 is a longitudinal section of the cutting end of the reamer, provided with a modified form of clamping means. Fig. 9 is an end elevation thereof showing the clamping bolt in section. Fig. 10 is a perspective view of the cutting end of a shank formed in accordance with that of Fig. 8. Fig. 11 is a longitudinal section of the cutting end of the shank and another form of means for clamping the cutting members thereto. Fig. 12 is a perspective view of the cutting end of a shank formed with grooves for attaching the cutting members. Fig. 13 is a cross section of the latter form of shank provided with cutting members and means for attaching the same.

. The same reference characters indicate the same parts wherever they occur.

Referring first to Figs. 1 to 7, the cutting end of a shank is indicated at 15 and is formed with a portion 16 which is rectangular in cross section but of which two opposite faces 17 are converging, said faces being equally inclined with relation to the axis of the shank. The faces 17 constitute bearings for cutting members 18 which are formed with cutting edges 19 and with grooves 20 having inclined faces 21. The cutting members are adapted to be mounted upon opposite sides of the portion 16 so that they embrace the said portion in the grooves and so that the inclined faces 21 shall bear upon the correspondingly inclined faces 17. By means of this construction and arrangement, the cutting edges 19 are adapted to be moved toward or from the axis of the shank by a sliding movement of the cutting members upon their inclined bearings. The means for adjusting and clamping the cutting members in the aforesaid figures, comprises a collar 22 internally threaded and constituting a nut engaging a threaded portion 23 on the shank. The collar constitutes not only one of a pair of clamping members but a gage by which the adjustment of the cutting members may be determined. The cutting members are adapted to abut against the collar 22 and to be clamped against the same by means of a washer 24 and a nut 25 screw-threaded upon a projecting portion 26 at the outer extremity of the portion 16. By reason of this construction and arrangement, it will be seen that movement of the cutters toward and from the axis of the shank is effected by longitudinal adjustment of the collar 22 and nut 25.

In Figs. 8, 9 and 10, the clamping means comprises instead of the nut 25 and screw-threaded extension 26 a screw-threaded socket 27 formed in the portion 16 and a bolt 28 inserted therein.

In Fig. 11 is shown a construction by which the cutting members may be clamped by pressure exerted upon them transversely of the axis of the shank. In this form the clamping means at the end of the shank is omitted and the means substituted therefor comprises a bolt 29 extending transversely through the cutting members and through an elongated aperture 30 formed in the portion 16. The end 31 of the bolt is screw-threaded and has coöperative engagement with a screw-threaded socket formed in one of the cutting members by means of which the cutting members may be drawn together so as to exert their greatest pressure upon the inclined bearings provided therefor. In this form the collar 22 which constitutes a gage for the cutting members, is employed, and the elongated aperture 30 provides for the longitudinal movement of the bolt 29 and corresponding adjustment of the cutting members.

For the purpose of locking the cutting members against radial displacement, the portion 16 of the shank is provided with oppositely extending ribs or tongue 34 formed in pairs of which each pair is parallel to the intervening bearing face 17. The cutting members are provided with grooves 35 adapted to receive the tongues 34.

In Figs. 12 and 13 is illustrated a shank and cutting members which afford a different arrangement of tongue and groove connection. In this form, the grooves are in the portion 16 and are indicated at 36. The cutting members are provided with tongues adapted to enter the grooves 36, said tongues in this form being composed of screws 37 inserted in screw-threaded sockets formed in said members. The grooves 36 are preferably V-shaped in cross-section, and the tongues or screws 37 are therefore pointed as illustrated. The tongues in this form may be used not only for the purpose of preventing lateral displacement of the cutting members but may be turned so as to engage the walls of the grooves tightly and so bind the cutting members as to also prevent longitudinal movement thereof. As a further means of clamping the cutting members, the end of the shank may be provided with a screw-threaded extension 26 adapted to receive a nut by which the members may be clamped against an adjusting collar on the screw-threaded portion 23.

Having thus explained the nature of my said invention and described a way of constructing and using the same, although without attempting to set forth all of the forms in which it may be made or all of the modes of its use, I declare that what I claim is:—

1. A reamer comprising a shank, a pair of cutting members each formed to embrace opposite sides of the shank, complemental tongues and grooves in the shank and cutting members adapted to secure opposite portions of each cutting member to opposite sides of the shank and prevent radial displacement of the cutting members, said complemental portions being equally inclined with relation to the axis of the shank, and means for securing the cutting members against movement in line with the grooves.

2. A reamer comprising a shank, a pair of cutting members each formed to embrace opposite sides of the shank, and complemental tongues and grooves connecting opposite portions of each cutting member with opposite sides of the shank, said tongues being adjustable and adapted to bind in the grooves and prevent endwise and radial displacement of the cutting members, and said grooves being equally convergent to the axis of the shank.

3. A reamer comprising a shank formed with converging grooves on each of two opposite sides, a pair of cutting members each adapted to embrace two opposed grooved portions of the shank, and screw-threaded tongues oppositely disposed in the cutting members adapted to extend into the grooves so as to bind the cutting members on the shank.

In testimony whereof I have affixed my signature, in presence of two witnesses.

WILLIAM TURNEY.

Witnesses:
W. P. ABELL,
P. W. PEZZETTI.